(12) United States Patent
McKenna et al.

(10) Patent No.: US 7,895,630 B2
(45) Date of Patent: Feb. 22, 2011

(54) SYSTEM AND METHOD FOR CONTENT DELIVERY TO LODGING ENTERTAINMENT SYSTEMS

(75) Inventors: Lee R. McKenna, Canistota, SD (US); Clay B. Meyer, Sioux Falls, SD (US); James L. Fenno, Sioux Falls, SD (US)

(73) Assignee: LodgeNet Interactive Corporation, Sioux Falls, SD (US)

( * ) Notice: Subject to any disclaimer, the term of this patent is extended or adjusted under 35 U.S.C. 154(b) by 2348 days.

(21) Appl. No.: 09/896,921

(22) Filed: Jun. 29, 2001

(65) Prior Publication Data

US 2003/0005449 A1    Jan. 2, 2003

(51) Int. Cl.
*H04N 7/20* (2006.01)

(52) U.S. Cl. .............................. 725/63; 725/67; 725/68; 725/70; 725/71; 725/78; 725/83; 725/85

(58) Field of Classification Search ............. 725/67–68, 725/70–71, 63, 78, 83, 85
See application file for complete search history.

(56) References Cited

U.S. PATENT DOCUMENTS

| | | | |
|---|---|---|---|
| 5,260,778 A * | 11/1993 | Kauffman et al. ............. 725/33 |
| 5,521,631 A | 5/1996 | Budow et al. .................. 348/7 |
| 5,600,573 A * | 2/1997 | Hendricks et al. ........... 725/109 |
| 5,603,077 A * | 2/1997 | Muckle et al. ............. 455/3.02 |
| 5,625,864 A * | 4/1997 | Budow et al. ................. 725/82 |
| 5,761,601 A * | 6/1998 | Nemirofsky et al. .......... 725/34 |
| 5,818,512 A | 10/1998 | Fuller ............................ 348/8 |
| 6,427,238 B1 * | 7/2002 | Goodman et al. ........... 725/136 |
| 6,735,776 B1 * | 5/2004 | Legate ......................... 725/25 |
| 6,792,615 B1 * | 9/2004 | Rowe et al. ................... 725/37 |
| 2002/0069418 A1 * | 6/2002 | Philips ........................ 725/87 |
| 2002/0083443 A1 * | 6/2002 | Eldering et al. ............... 725/34 |

* cited by examiner

*Primary Examiner*—John W Miller
*Assistant Examiner*—Sumaiya A Chowdhury
(74) *Attorney, Agent, or Firm*—Kinney & Lange, P.A.

(57) ABSTRACT

Entertainment content is delivered in an encrypted digital format from a home base via satellite to individual lodging properties (sites) having an in-room entertainment system. Each digital file containing content (such as a movie) is accompanied by a sites file which identifies the name of the content file and the sites to which the content file is being transmitted. Each site includes a host computer, a digital content receiver, a digital content server guest terminals in the guest rooms, and a distribution network for distributing content from the digital content server to the guest terminals. The digital content receiver receives the transmitted digital content and sites files, and provides the files to the digital content server for storage and later use.

26 Claims, 1 Drawing Sheet

SYSTEM AND METHOD FOR CONTENT DELIVERY TO LODGING ENTERTAINMENT SYSTEMS

CROSS-REFERENCE TO RELATED APPLICATION(S)

None.

BACKGROUND OF THE INVENTION

The present invention relates to systems that provide in-room entertainment at hotels and other lodging facilities. In particular, the invention is an improved system for delivery of entertainment content such as movies to individual hotel sites.

The past two decades have seen the wide scale introduction of entertainment systems in hotels and other lodging facilities. These systems provide a variety of services to the guest through the guest room television. The services typically include regular off-air television programs, pay-per-view movies, Internet access, and guest services such as video shopping and video checkout.

A typical hotel entertainment system contains a head end, a distribution system, and guest terminals located in each of the guest rooms. The head end includes devices to generate entertainment content such as movies and video games, as well as devices to provide Internet access and generate interactive menus and other services. The head end also includes modulators and video switching equipment necessary to place the television signals from the various sources on to the appropriate channels for transmission through the distribution system to the guest terminals. A host computer coordinates operation of the entertainment system by receiving key stroke information from the guest terminals and controlling operations of various sources of television signals so that the guest receives the entertainment or services which he or she has requested.

Typically, lodging entertainment systems are not owned by the hotel, but rather are owned by a vendor who provides the head end equipment, and the guest terminals (including the television, remote control, game controller, keyboard, and associated control circuitry which interfaces the television to the distribution system).

The entertainment system vendor owns the equipment and pays for the installation of the system in the lodging facility. The vendor must also provide the content, such as movies, games, and cable/satellite programming. The vendor receives compensation based upon amounts the hotel collects from the guest for pay-per-view movies, games, Internet access, and other services for which charges are made. The hotel usually receives a percentage of the guest charges, and the sources of content, such as motion picture studios and game program vendors, receive royalties for movies and games which are viewed and played by guest.

In the past, most of the video sources for pay-per-view movies in hotel entertainment systems have been video cassette players pre-loaded with videotapes of movies. Although the early systems offered only a small number of movies (typically six or eight) at scheduled playing times, the widespread adoption of video-on-demand movie offerings has resulted in the need for many more video tapes and video cassette players. Typical systems include from about 16 to more than 20 different movie offerings.

The use of video cassette players and video tapes requires substantial tape duplication resources, and a service organization to deliver new tapes to each site, remove old or damaged tapes, and set up the system with a new lineup of movie offerings. This has, in the past, involved a monthly visit from service personnel to replace or change over movies. If tapes break or malfunction, additional service visits are required.

More recently, the development of very large mass memories and digital video server technology has offered an alternative to the use of arrays of video cassette players and videotapes. The digital server stores movies and other digital content in an encoded format such as MPEG-2 and includes decoders for decoding the digital data to create the audio and video television signals which are supplied to the guest terminal through the distribution system.

While the use of digital servers in a lodging entertainment system offers a number of advantages, the need for monthly service calls is not eliminated. Service personnel still must visit each site with a storage medium containing the content for the next month. This may be stored, for example, on a replaceable disk drive which is swapped each month by the service person. Duplication of storage media for each site is also required, just like in the systems that require the use of videotapes.

There is a continuing need for a system of delivering entertainment content to individual sites that reduces the number of visits required by service personnel to maintain conventional entertainment systems.

BRIEF SUMMARY OF THE INVENTION

An improved system for delivering entertainment content to individual sites makes use of satellite transmission. The digital content is delivered from a home base of the system vendor, to a satellite uplink and then by satellite to each of the sites in the form of encrypted digital files representing the individual items of content (such as a movie). A sites file is associated with and transmitted prior to each digital file. The sites file identifies the digital file to be transmitted, and the intended recipients of that file.

At each site, a digital content receiver receives the sites file and the associated digital file. Based upon the information contained in the sites file, the digital content receiver checks whether the digital files are intended for its site, and checks a directory of digital content already stored by a digital content server at the site. If the digital file to be transmitted is intended for that site, and if the digital content server has not already stored a file of that particular content, then the digital content server stores the digital file. The file is transferred to the digital content server, where it is stored and is listed in a directory of stored content. The stored content is then available for purchase on a guest-selectable basis over a distribution network located at the site.

DETAILED DESCRIPTION

Figure 1:
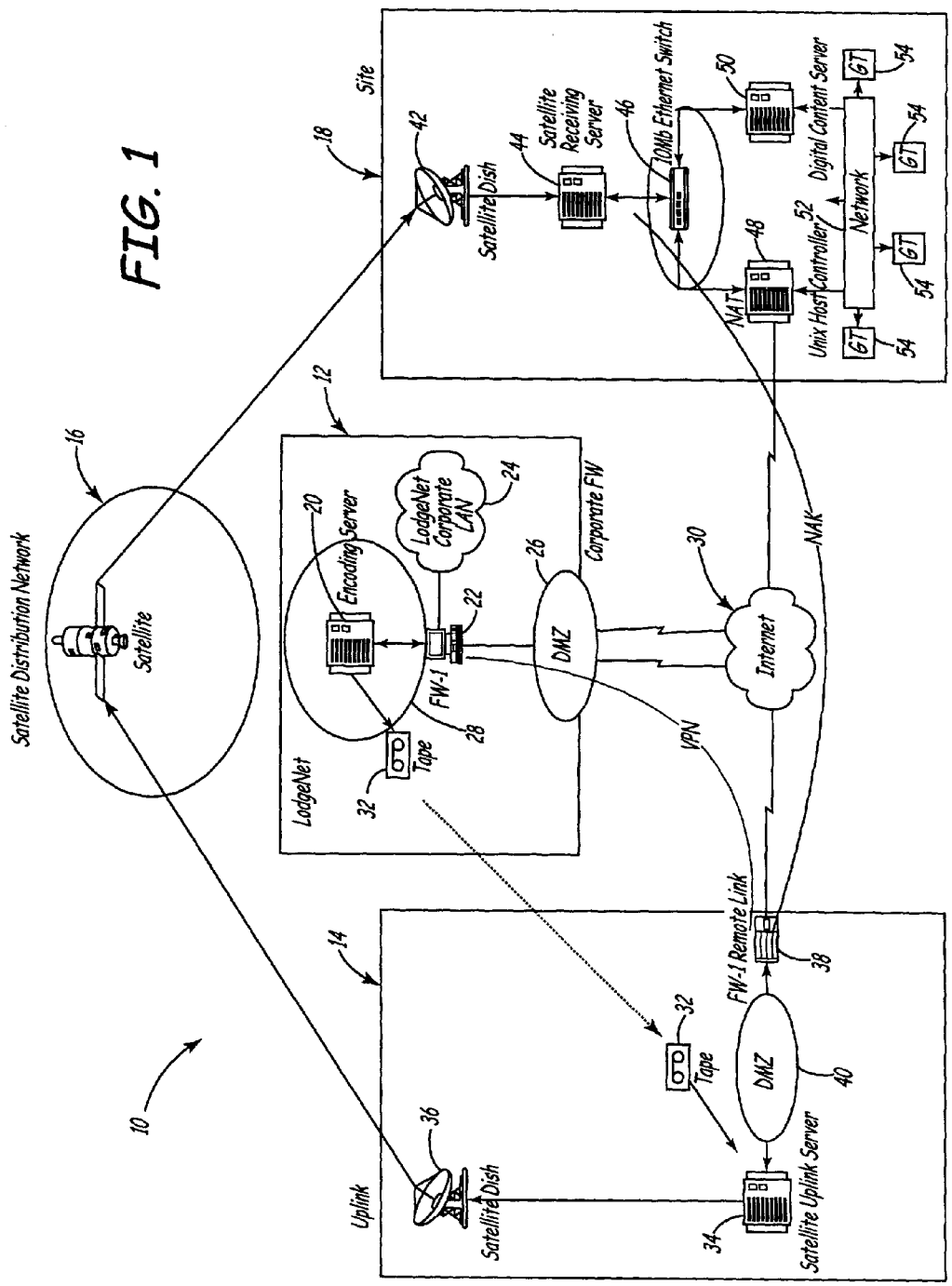
FIG. 1 is a diagram of a digital entertainment content distribution system.

FIG. 1 is a diagram of digital entertainment content distribution system 10 which delivers digital entertainment content (DEC) from home base 12 to satellite uplink facility 14 and then via satellite 16 to site 18. For simplicity, FIG. 1 shows a single site 18—a hotel having an in-room entertainment system. In practice, DEC distribution system 10 typically includes many sites in different geographic locations.

Home base 12 is typically the corporate headquarters of the entertainment system vendor. Home base 12 includes encoding server 20, system server 22, corporate LAN 24, corporate firewall 26, and internal firewall 28. System server 22 communicates with uplink facility 14 and sites 18 through Internet 30. Encoded DEC is delivered to uplink facility 14 either on high capacity storage device 32 (such as a tape or a hard disc drive) or through Internet 30.

Uplink facility 14 includes satellite uplink server 34, satellite uplink 36, remote link 38 and firewall 40. Encoded DEC, along with related sites files, is provided by satellite uplink server 34 to satellite uplink 36 for transmission to satellite 16. Other files, such as schedule files, software updates, and diagnostic information may also be transmitted to satellite 16 from uplink facility 14.

Site 18 includes satellite dish 42, digital content receiver (DCR) 44, Ethernet switch 46, UNIX host computer 48, digital content server 50, distribution system or network 52 and guest terminals 54. For a further description of the components of network 52, see U.S. application Ser. No. 09/724,289, filed Nov. 28, 2000, for "Lodging Entertainment System with Guest-Selected Time Shifting" by D. Bankers, S, Silverberg, G. Kolbeck, B. Pelletier, and R. Califf. Each guest terminal 54 includes a television, a remote control, a game controller, a keyboard and a control card in the television which interfaces guest terminal 54 with network 52, UNIX host controller 48, and DCS 50.

Prior to transmission of the DEC from satellite uplink facility 14, the DEC is encrypted at home base 12 using encoding server 20. Encoding server 20 preferably uses GNU's Pretty Good Privacy (PGP) software to encrypt the DEC. The encrypted DEC is typically delivered to satellite uplink facility 14 by storing the DEC on high capacity storage device 32 and shipping high capacity storage device 32 to satellite uplink facility 14. The encrypted DEC can also be delivered to satellite uplink facility 14 via Internet 30.

As the DEC is encrypted, a "sites file" is attached to each DEC file (i.e., movie, video game, etc.). The sites file contains the name of the DEC file, a flag to indicate whether the DEC file is to be delivered to all sites, and, at times, an individual flag for every site that is to receive the DEC file. For example, if the flag indicating whether the DEC file is to be delivered to all sites is activated, then all sites having a satellite downlink would receive the DEC file, and no individual sites would be listed. Alternatively, if the flag indicating whether the DEC file is to be delivered to all sites is deactivated, then a list of individual sites to receive the DEC file (with flags activated) would also be included in the sites file.

After delivery of the DEC to satellite uplink facility 14, the sites files attached to each respective DEC file are added to an uplink list located on satellite uplink server 34. Satellite uplink server 34 is connected to satellite uplink 36 and regulates the DEC transmitted over satellite uplink 36, according to the sites files in the uplink list. That is, the uplink list contains a list of all of the sites files that are to be broadcast over satellite uplink 36. The software on satellite uplink server 34 continuously checks the uplink list to determine if any changes have been made to the list. If the uplink list has not changed, then satellite uplink 36 continues to broadcast the DEC listed in the unchanged uplink list. If the uplink list has been changed, satellite uplink 36 will start broadcasting the first DEC file listed in the uplink list. In both circumstances, when the last DEC file list in the uplink list has been sent, satellite uplink 36 starts over with the first DEC file listed in the uplink list and begins retransmission of all DEC files. The continuous retransmission of DEC files increases the probability that site 18 receives at least one errorless copy of each DEC file.

To understand the delivery of DEC between satellite uplink facility 14 and site 18, an example involving the transmission of a single DEC file is provided. To begin, the sites file for the DEC file to be sent is transmitted by satellite uplink 36 to satellite downlink 42 via satellite 16. Satellite uplink server 34 then pauses briefly to allow site 18 to receive the sites file on a first reception channel on satellite downlink 42, and to determine whether it is one of the sites included in the sites file. If site 18 is not included in the sites file, satellite downlink 42 will keep the first reception channel open and await transmission of subsequent sites files from satellite uplink facility 14. If site 18 is included in the sites file, site 18 will open a second reception channel on satellite downlink 42, and will receive the DEC file subsequently transmitted from satellite uplink facility 14 by satellite uplink 36. After a DEC file is received by satellite downlink 42, a process to decrypt the DEC file is started. Once the decryption process has started, satellite downlink 42 will listen on the first reception channel for the next sites file transmitted from satellite uplink facility 14.

DCR 44 stores the encrypted DEC after it has been received on satellite dish 40. DCR 44 contains a removable hard drive, preferably having a storage capacity of at least 75 gigabytes (GB). A hard drive this size is necessary to store all of the new DEC that is delivered to site 18 at one time. Furthermore, the DCR 44 hard drive preferably contains one partition with three directories: an "acquire" directory, a "content" directory, and a "history" directory.

The "acquire" directory is used to acquire content from satellite downlink 42. After a DEC file has been acquired and placed in the acquire directory, the DEC file is then decrypted on DCR 44. During the decryption process, the DEC file is decrypted into a file having a name such that the DEC file will not be recognized by UNIX host computer 48 as being available for user purchase until the decryption process is complete. Decryption is performed on DCR 44 because the decryption process is very CPU intensive and takes a considerable amount of time. In this embodiment, decryption is not performed on DCS 50 (where the guest-selectable DEC files are stored), since this would adversely affect the playing of the DEC. Once the decryption process is complete, the DEC file is renamed so that the DEC file will be recognized as being decrypted and ready for import to DCS 50. Finally, the original encrypted DEC file is removed from the acquire directory.

The "content" directory is where a DEC file is placed by DCR 44 after it has been successfully decrypted. UNIX host computer 48 accesses this directory through Ethernet switch 46 to determine if a new DEC file available to be installed on DCS 50. UNIX host computer 48 determines whether a DEC file is new by comparing the name DEC file in the "content" directory with the names of the DEC files on DCS 50. If the DEC file is new, UNIX host computer 48 begins installation of the new DEC file on DCS 50 through Ethernet switch 46. When installing DEC from DCR 44 to DCS 50, care must be taken to ensure that each file is copied in its entirety. Because there are three separate systems involved in the installation process (DCR 44, UNIX host computer 48, and DCS 50), site 18 must be able to recover if any one of the systems goes down. Thus, when a DEC file is copied from the content directory on DCR 44 to DCS 50, a temporary DEC file is stored on DCS 50. Once the copy is completed, the temporary DEC file is given its permanent name and the DEC file is removed from DCR 44. If the copy process fails, the next time the DEC file is installed from DCR 44 to DCS 50, UNIX host computer 48 will begin copying over the temporary DEC file on DCS 50.

The "history" directory is used to keep track of the DEC files that have been successfully received on satellite downlink 42. After a DEC file has been decrypted and placed in the content directory, a zero byte file having the same name as the file placed in the content directory is created in the history directory. When a sites files is subsequently received on satellite downlink 42, the history directory is checked to see if a file with the same name already exists. If such a file exists, the sites file is ignored, the content is not received, and satellite downlink 40 continues to listen for future sites files.

When delivery of DEC via satellite is impractical or impossible, an alternative method of delivery is necessary. DEC can also be manually delivered by service personnel to site 18 via a hard drive. In this situation, there is no need for a sites file to be generated; all of the content that will be written to the hard drive will be destined for a particular remote location. When the hard drive arrives at site 18, the service personnel shuts down DCR 44, and swaps the new hard drive with the existing removable hard drive in DCR 44. Then, the service personnel restarts DCR 44, and subsequently starts the DEC decryption process. The DEC is decrypted by DCR 44 into the same directory structure (described above) as if the content was delivered via satellite 16. This allows the DEC import process to work in the same manner for either type of delivery method. The manual delivery of a hard drive containing DEC to site 18 may be used until a satellite distribution system is installed at a property, as a backup to that system, or as a permanent means of content delivery if a satellite receiver cannot be installed.

DCS 50 contains a hard drive with sufficient capacity to store all of the digital content for site 18. The hard drive in DCS 50 has different directories for each of the different services offered at site 18. For example, DCS 50 may contain a directory for movies, a directory for music, and a directory for video games. This gives the ability for each site 18 to have a customized schedule of service, (i.e. different DEC) depending upon its needs. Site 18 may also incorporate multiple DCS's, depending on the size of site 18, in which each DCS would contain the same DEC. Having multiple DCS's would decrease the possibility of overworking a single DCS. Overworking a DCS could adversely affect the playing of DEC.

When a guest wishes to purchase DEC, the guest presses a key on the remote control to turn on the television. A welcome screen will first appear on the TV screen of guest terminals 50. If the guest wishes to view off-air or satellite programming, which is free programming, those channels are accessible by-pressing the channel up or channel down keys on the remote control. If, on the other hand, the guest wishes to view and perhaps select other offerings available on DCS 50, such as on-demand movies, Internet access, interactive video games, recording of broadcast programs for time-shifted viewing, or interactive services, the welcome channel screen provides an instruction to the user to select a menu.

In order to provide guests with the described on-screen menus and messages, a file, called a "schedule import file," must also be delivered to site 18. This file may be delivered either at the same time as the encrypted DEC file via satellite 16, or independent from the encrypted DEC files, such as via satellite 16 or Internet 28. The schedule import file contains a schedule file and related GIF and text files. The schedule file may include a schedule for every service (e.g. movie, game, time-shifted TV programming, etc.) that requires scheduling, or it may contain a schedule just for those services that require a schedule change. Each schedule includes fields for different aspects of the service to which the schedule pertains. Thus, example fields in a movie schedule are the title of the movie, the category of the movie (e.g., action, adventure, new release, etc.), the movie rating, the purchase price of the movie, the start date of the movie (i.e., the date the movie first can be purchased), and the end date of the movie (i.e., the date the movie last can be purchased). The GIF and text files are used in conjunction with the schedule file to present menus, on-screen descriptions and order screens to guests the DEC services in a visual format on the television screen at guest terminals 50.

One important aspect of the present invention is the ability to deliver DEC at any time desired, rather than on a monthly basis, as was typical in entertainment systems requiring manual delivery of DEC. This is advantageous because, for example, new release movies typically are released at various times throughout a month. In other words, new release movies are not released at a certain point each month. This was problematic in entertainment systems requiring manual delivery of DEC each month because, if a movie was released shortly after the monthly delivery, several weeks would pass before the newly released movie would be available at a particular site 18. According to the present invention, as soon as a movie is released, it can be sent from satellite uplink facility 14 to site 18 via satellite 16, and be available for viewing at guest terminals 50 as soon as the day of release. In order to alert guests of the availability of the new movie, the new schedule import file (which would typically be sent at the same time as the new movie) may contain textual and visual alerts that would be displayed on the welcome screen. This alert system is especially important for long-stay guests, who can be informed of the latest updates to available DEC simply by turning on the television at guest terminals 50.

The present invention provides a method of delivering digital entertainment content from a central location to remote locations for use in an entertainment system offering guest-selectable entertainment content at the remote locations. In the past, most of the video sources for pay-per-view movies in hotel entertainment systems have been video cassette players pre-loaded with videotapes of movies. More recently, the development of very large mass memories and digital video server technology has offered an alternative to the use of arrays of video cassette players and videotapes. However, service personnel still must visit each site with a storage medium containing the content for the next month.

To reduce the number of visits required by service personnel, the present invention allows electronic delivery of entertainment content in digital format from home base 12 to remote site 18 via satellite 16. The DEC is first encoded at home base 12. Then, the encoded DEC is delivered to satellite uplink facility 14, where it is transmitted to the DCR 44 at site 18 via satellite 16. Once the encoded DEC arrives at site 18, DCR 44 decrypts the DEC and stores it on DCS 50. The DEC is then accessible through the guest terminals 54 for purchase. This method of delivery is advantageous in that the DEC can be updated at any time, thus giving guests access to constantly current entertainment content.

The present invention is compatible with a wide variety of different DEC of differing length, subject matter, and marketing lifetime. For example, in addition to providing movies and video games as DEC, home base 12 can also provide music, time-shifted television programs, and web videos.

Another advantage of the present invention is the ability to transmit software updates, (e.g., for UNIX host computer 48), as well as DEC files, site files, and schedule files. DCR 44 recognizes software updates as different files from schedules, sites files, and DEC, and routes the software update files to the appropriate device, such as UNIX host computer 48. This further reduces the need for trips to every site 14 whenever a system upgrade is made. The system also allows diagnostic information to be exchanged between home base 12 and sites 18 either via satellite 16 or the Internet 28, or by a combination of both.

The present invention also provides an important advantage during the initial installation of the entertainment system at each site 18. The installation may be made without requiring the installation personnel to install the DEC or the related schedule files in the system. Instead, the installation begins with the setup of satellite downlink 42, DCR 44, Ethernet switch 46, UNIX host computer 48, and DCS 50. Then, while network 52 and guest terminals 54 are being installed, DEC is being received, decrypted, and stored in DCS 50. By the time the rest of the system is installed, DCS 50 is loaded with the latest DEC and is ready to begin operation.

Although the present invention has been described with reference to preferred embodiments, workers skilled in the art will recognize that changes may be made in form and detail without departing from the spirit and scope of the invention. For example, in an alternative embodiment DCS 50 includes on-the-fly decryption hardware and software associated with each output port, so that decryption takes place at DCS 50 rather than at DCR 44. This requires greater hardware/software cost at each site 18, but provides greater security since the DEC is always stored in encrypted form.

The invention claimed is:

1. A method of delivering digital entertainment content to a site having an in-room entertainment system including a digital content receiver, a digital content server, a distribution network and a plurality of guest terminals for selecting and receiving entertainment content transmitted from the digital content server over the distribution network, the method comprising:
    opening a first reception channel on the digital content receiver at the site;
    transmitting via satellite, to the first reception channel at the site, a sites file containing an identification of a digital file to be transmitted containing the digital entertainment content and an identification of sites to receive the digital file;
    opening a second reception channel on the digital content receiver at the site if it is identified in the sites file and if the digital file has not previously been received;
    transmitting via satellite, to the open second reception channel at the site, the digital file;
    receiving the digital file with the digital content receiver; and
    transferring the digital entertainment content contained in the digital file from the digital content receiver to the digital content server.

2. The method of claim 1, further comprising:
    encrypting the digital entertainment content at a home base to form the digital file;
    delivering the digital file from the home base to a satellite uplink; and
    decrypting the digital entertainment content for delivery by the digital content server over the distribution network.

3. The method of claim 1, wherein the digital content receiver maintains a list of the digital files received by the digital content receiver.

4. The method of claim 3, wherein the list of the digital files received by the digital content receiver is compared to the digital file identified in the sites file to prevent duplication.

5. The method of claim 1, further including:
    regulating, with a host computer interface, the digital entertainment content transfer from the digital content receiver to the digital content server.

6. The method of claim 1, wherein, at the sites omitted from the sites file, the first reception channel remains open to receive subsequent sites files.

7. The method of claim 1, wherein the sites file includes a designation flag such that, when the designation flag is activated, all sites open the second reception channel on the digital content receiver to receive the digital entertainment content.

8. The method of claim 1, further comprising:
    transmitting schedule files via satellite to the sites.

9. A method of delivering digital entertainment content from a first location to remote locations for use in an entertainment system offering guest-selectable entertainment content at the remote locations, the method comprising:
    encrypting the digital entertainment content at the first location;
    delivering the encrypted digital entertainment content from the first location to a satellite uplink location;
    transmitting via satellite an identification of remote locations to which the encrypted digital entertainment content will be transmitted and an identification of the encrypted digital entertainment content;
    transmitting via satellite the encrypted digital entertainment content from the satellite uplink location to remote locations;
    receiving the transmitted encrypted digital entertainment content at remote locations that were identified and at which a copy of the encrypted digital entertainment content does not already exist;
    storing the encrypted digital entertainment content received on a digital content receiver;
    transferring the digital entertainment content on the digital content receiver to a digital content server; and
    storing the digital entertainment content on the digital content server.

10. The method of claim 9, further including:
    regulating, with a host computer interface, the digital entertainment content transfer from the digital content receiver to the digital content server.

11. The method of claim 9, wherein the digital content receiver maintains a list of the digital entertainment content received by the digital content receiver.

12. The method of claim 9, wherein, in case of satellite malfunction, the digital entertainment content is transmitted to the remote locations via a terrestial link.

13. The method of claim 9, further comprising:
    transmitting schedule files via satellite to the remote locations.

14. An entertainment system at a site, the system comprising:
    a plurality of guest terminals;
    a distribution system connected to the guest terminals;
    a digital content server for storing digital entertainment content in digital files and supplying the entertainment content signals based upon the digital files over the distribution system to the guest terminals;
    a digital content receiver for receiving sites files and digital entertainment content via satellite, and storing the entertainment content on the digital content server, wherein the sites files identify digital entertainment content to be transmitted and sites to which it is intended, and wherein the digital content receiver only receives digital entertainment content that is intended for the site at which the digital content receiver is located and that is not already stored on the digital content server; and a computer which communicates with the guest terminals over the distribution system and controls operation of the digital content receiver and the digital content server.

15. The system of claim 14, wherein the digital content receiver includes a hard drive for storing digital entertainment content.

16. The system of claim 15, wherein the hard drive contains an acquire directory, a content directory and a history directory.

17. The system of claim 14, wherein the computer controls the installation of the digital entertainment content from the digital content receiver to the digital content server.

18. The system of claim 14, wherein, in response to a request from a guest terminal, the computer causes the digital content server to supply digital entertainment content based upon the digital file representing selected content.

19. The system of claim 14, wherein the computer provides the guest terminals with on screen information about the digital entertainment content.

20. The system of claim 19, wherein the computer provides information on screen about the digital entertainment content based upon a schedule file received by the digital content receiver.

21. The system of claim 14, wherein the computer controls operation of the digital content server based upon a selection by a guest of digital entertainment content to be viewed.

22. A method of delivering digital content to a site having a digital content receiver, a digital content server, a distribution network and a plurality of video devices for viewing the content transmitted from the digital content server over the distribution network, the method comprising:

opening a first reception channel on the digital content receiver at the sites;

transmitting via satellite, to the first reception channel at the site, a sites file containing an identification of the digital content and an identification of sites to receive the digital content;

opening a second reception channel on the digital content receiver at the site if it is identified in the sites file and the site does not already have a stored copy of the digital content;

transmitting via satellite, to the open second reception channel at the site, the digital content;

receiving the digital content with the digital content receiver; and transferring the digital content from the digital content receiver to the digital content server.

23. The method of claim 22, further comprising:

encrypting the digital content at a home base;

delivering the encrypted digital content from the home base to a satellite uplink; and decrypting the digital content for delivery by the digital content server over the distribution network.

24. The method of claim 22, wherein, at the sites omitted from the sites file, the first reception channel remains open to receive subsequent sites files.

25. The method of claim 22, wherein the sites file includes a designation flag such that, when the designation flag is activated, all sites open the second reception channel on the digital content receiver to receive the digital entertainment content.

26. The method of claim 22, further comprising:

transmitting schedule files via satellite to the sites.

* * * * *